March 28, 1939.　　　　F. L. HALL　　　　2,152,380
WHEEL MACHINING APPARATUS
Filed Nov. 5, 1938　　　3 Sheets-Sheet 1
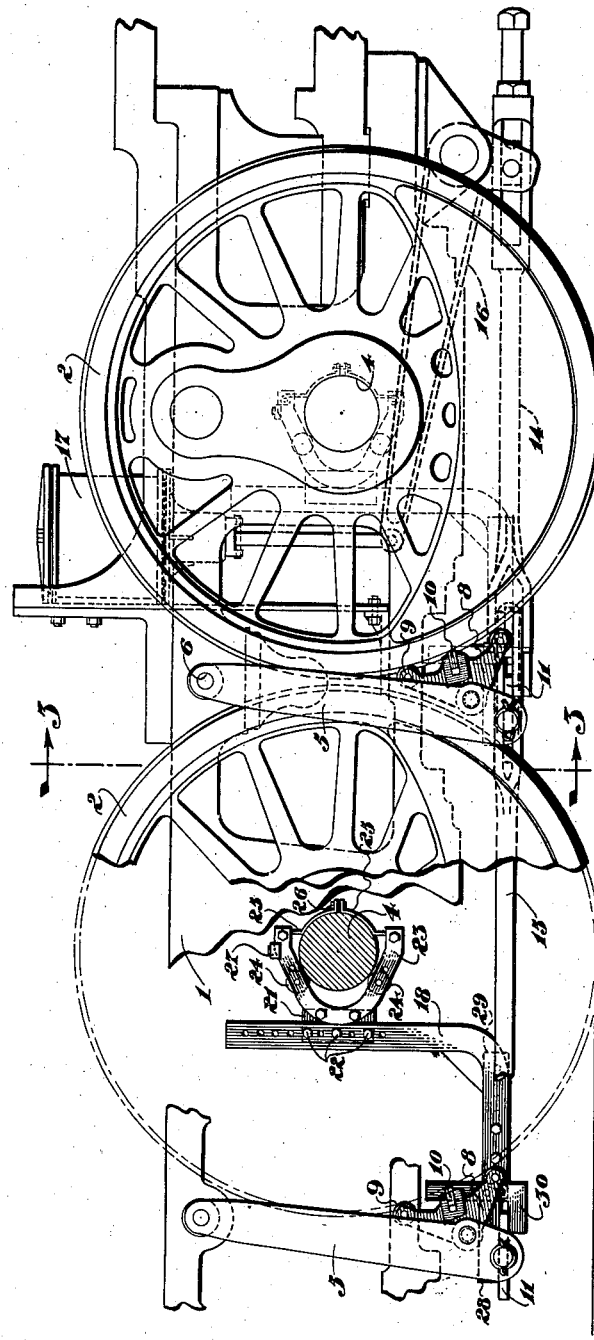
INVENTOR.
Frank L. Hall
BY Wood & Wood
ATTORNEYS

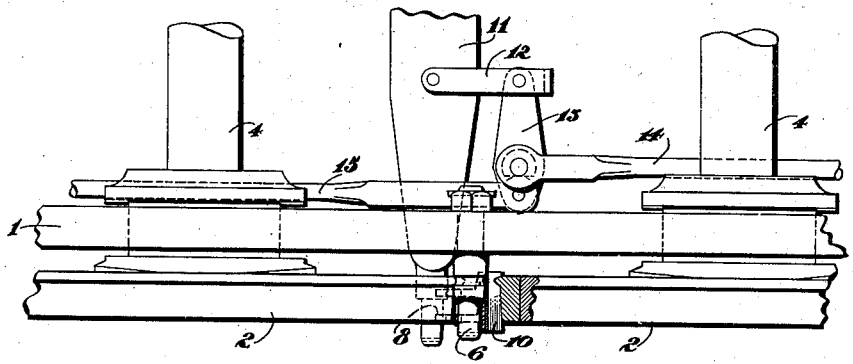
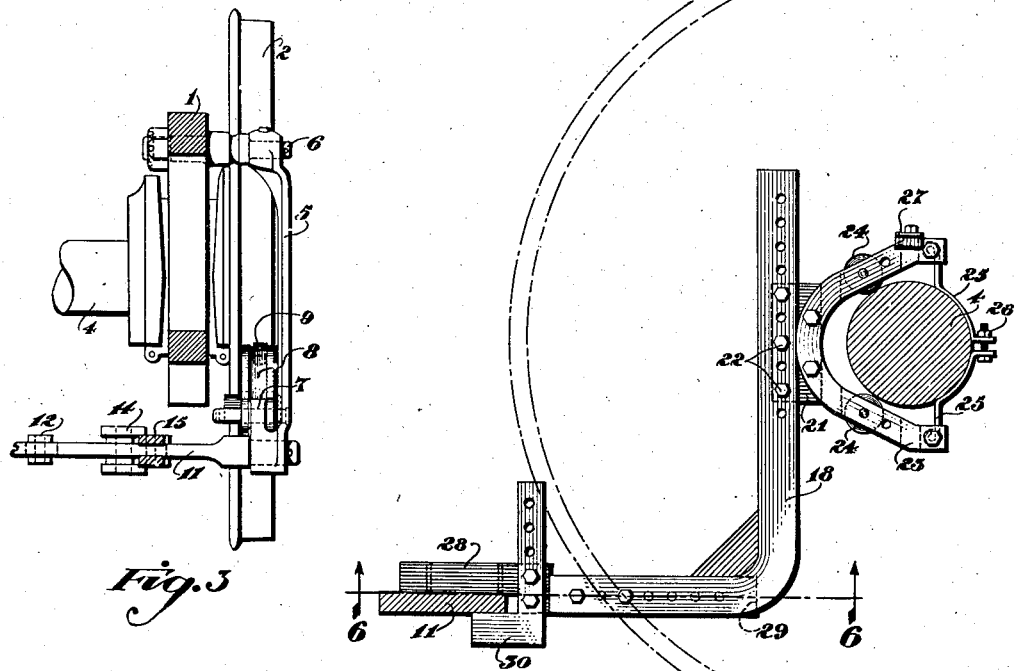

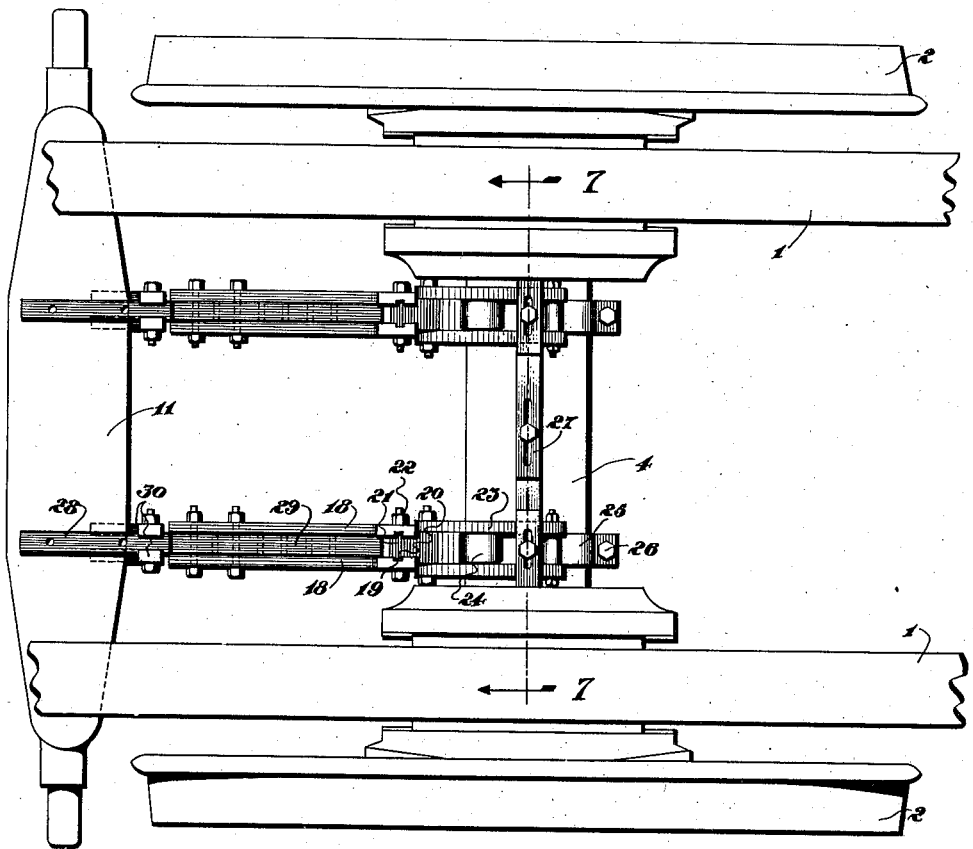

Patented Mar. 28, 1939

2,152,380

UNITED STATES PATENT OFFICE 2,152,380

WHEEL MACHINING APPARATUS

Frank L. Hall, Cincinnati, Ohio

Application November 5, 1938, Serial No. 239,106

8 Claims. (Cl. 82—4)

This invention relates to apparatus and method for machining or reconditioning the treads or tires and flanges of wheels of railway rolling stock. The apparatus is primarily applicable to the braking mechanism for the wheels through the substitution of a tool holder and metal cutting tool for the brake head and shoe carried by the braking mechanism, whereby when the braking pressure is applied, the cutting tool is engaged against the tire or tread surface of the wheel and machines the same upon transporting the vehicle upon the rails of a section of railway track. In this manner the tread surface of a worn tire can be reconditioned or turned to a true circle and the height of the flange, which has been increased on account of the wear of the tread, reduced with respect to the tread. The tread reconditioning is performed without dismantling or removing the wheel or wheels from the truck or under-frame of the railway vehicle, which would necessitate its retirement from service for quite a period and therefore a considerable reduction in time, labor, and expense is effected.

It has heretofore been a practice to utilize the braking mechanism of a railway vehicle for dressing the wheel tire by merely substituting a tool holder for carrying a metal cutting tool for the brake head and shoe, and in applying the brake pressure the tool is forced against the circumference of the wheel tire. Its use, however, under the governmental regulations, has only been permitted for dressing the edges of the tire as to cut off the burrs or slightly reduce the flange height without touching or cutting into the tread surface, due to the inability and inefficiency of the apparatus to effect a machining or turning of the tread surface to a true circle and refinishing all of the corresponding sized wheels of the vehicle to the same diameter, or within a variance of not more than three thirty-seconds inch.

It is an object of the invention to utilize the wheel braking mechanism of a railway vehicle for restoring the worn tire of the wheels by the substitution of a tool holder and metal cutting tool for the brake head and shoe, and to provision for governing and controlling the degree of tool cutting feed, or depth, of cut, holding the same constant for the full circumference of the tread surface of the tire to a definite radius with the axis of the wheel to insure machining the tire to a true circle, uniform and equidistant at all points with the axis of the axle upon which the wheel is fixed, and turn the tires of the wheel on the same axle or in the same driving wheel base, so that their diameters do not vary more than governmental regulations permit.

Another object of the invention is to provide a tool holder for mounting upon a brake hanger in substitution of a brake head for supporting a cutting tool for engagement with the tread of the wheel, and at one side of the cutter extended for contact with the tread surface of the wheel, and adjustable relative thereto, as a steady rest for the tool.

Other objects and further advantages will be more fully apparent from a description of the accompanying drawings, in which:

Figure 1 is a side elevation of one side of a locomotive drive wheel assembly with the improved apparatus for turning or dressing the tires or treads and flanges of the wheels.

Figure 2 is a top plan view of the same.

Figure 3 is a section on line 3—3, Figure 1.

Figure 4 is a detail side elevation of a radius bar or centering device as a part of the apparatus for turning or dressing the tire of a wheel, and to which the invention is particularly directed.

Figure 5 is a top plan view of a pair of radius bars applied upon a wheel axle in position for use.

Figure 6 is a section on line 6—6, Figure 4.

Figure 7 is a section on line 7—7, Figure 5.

Figure 8 is a side view of a modified form of tool holder, shown mounted upon the lower end of a hanger lever of the brake mechanism in substitution of a brake head.

Referring to the drawings, I designates the under-frame of a locomotive, and 2, 2, a pair of drive wheels fixed upon relative opposite ends of an axle 4, the axle journalled in bearings mounted within the under-frame in the usual manner. The conventional brake mechanism for the wheels is employed for carrying a tool holder in substitution of the brake head and shoe.

The brake mechanism may be of any conventional type. In the form illustrated, and to the extent it is of utility for wheel tire turning or truing, the brake mechanism comprises a pair of hanger levers 5, 5, dependingly pivotally supported upon the under-frame respectively at relative opposite sides thereof, each at its upper end pivotally mounted upon a stud 6 fixed to and projecting laterally from the outer side of the under-frame.

The hanger lever at its lower end is provided with a trunnion 7 (Fig. 3) for pivotally connecting a brake head thereon, the brake head carrying a shoe for engagement with the tread of the wheel. The brake head and its shoe in truing or turning a wheel tire are removed and a tool holder 8 is substituted, which is characteristic to the brake head, particularly in that it is somewhat of crescent outline to provide a pair of arms projected or extending from relative opposite sides of its fulcrum, the extremities thereof each journalling a roller 9 for making an anti-friction contact against the circumferential surface of the tread or tire of the wheel. Intermediate of its arms or ends the tool holder is transversely grooved for the reception of a metal cutting tool 10 which acts upon the wheel tire or tread surface for truing the same.

The hanger lever at its lower end is provided with a bearing for making a trunnion connection with a horizontally disposed floating brake beam 11. The brake beam extends crosswise of the under-frame, approximately parallel with the wheel axle, and provides a connecting link for a pair of hanger levers extending from relatively opposite sides of the under-frame. Upon actuating the brake beam, the hanger levers are oscillated or moved to bring the tool holder and its cutting tool either into or away from cooperation with the wheel in a manner substantially the same for operating a brake head and its shoe to apply or release the brake shoe for a wheel braking control.

A bracket 12 is secured to and projects from the floating brake beam 11, as illustrated in Figures 2 and 3, and at its outer end has a lever 13 pivotally connected thereto. The lever 13 normally extends at right angles from the bracket, and has the usual brake rods 14 and 15 pivotally connected thereto at its outer end.

The brake rod 14 extends longitudinally of the under-frame and has its forward end pivotally connected to a bellcrank lever 16 mounted upon the under-frame and in connection with the piston operative within a fluid pressure cylinder 17. The brake rod 15 extends in an opposite direction from the brake rod 14 to connect with a brake beam 11 of a second brake mechanism, in duplicate of the first heretofore described, for serving a second set of wheels. The brake mechanism for the drive wheels on one side of the locomotive is in duplicate for the relative wheels at the opposite sides, insofar as the actuating connections and parts for operating a brake beam is concerned. The brake mechanism illustrated is of conventional type and may, in substitution, correspond to any other type with which a locomotive or truck or railway vehicle is equipped for suspendingly sustaining a brake head and shoe for cooperation with the wheel tread, and which will permit the brake head and shoe to be removed and an appropriate tool holder and metal cutting tool substituted so as to be actuated by and through the control of the brake mechanism for moving the cutting tool into and out of active position with the wheel tire or tread for machining or truing the tread surface and flange of the wheel without removal of the wheel from the axle or dismanteling the running gear from the vehicle.

In the use of the braking mechanism as the means for sustaining and operating the tool holder, its application is the same whether the brake shoes engage either a front or rear side of the wheel excepting that its position governs the direction of wheel rotation for machining or turning. When the brake shoes are located on the front side, the locomotive or vehicle is moved forwardly and when located in the rear of the wheel the direction of movement is reversed or backward. As illustrated the apparatus is adapted to recondition one or several wheels simultaneously without change of operation, recognizing, however, that the cutting tool for each wheel is appropriately set so as not to unduly influence the effectiveness of the other cutting tools for the several wheels.

After the tools have been properly set within their holders, air is applied to the air pressure cylinder which forces the holders and their respective cutting tools against the tires of the wheels, whereupon the locomotive is moved very slowly by some suitable motive power as by another locomotive or a winch, known as a "ledgerwood".

The metal cutting tool 10 may be either of sectional form or one piece, the sectional form being usually employed in making a roughing cut, one section serving for the tread and a second for the flange, while the tool for making a finishing cut is usually of one piece taking in both the tread and flange, and in some instances, a particular shape is employed for removing burrs from the outside edge of the tire. The cutter can be changed as desired by relieving of brake cylinder pressure, after which it can be easily removed for replacement.

The apparatus and parts above described are conventional to a type now employed by railroads, but under governmental regulations can only be used for turning the wheel flanges. It cannot be operated with sufficient accuracy to turn the tire of the wheel to a true circle, or a pair of wheels on the same axle to within the allowable tolerance, so that its use on tires has not been permitted. It does not, as contemplated, supersede the extremely costly and laborious method of removing the wheels from the trucks or underpinnings of the locomotive and center chucking within a wheel turning lathe for tire reconditioning and machining.

By the aid of the instrumentality of the present improvement, herein designated as a radius or centering device, in conjunction with the apparatus and method of turning or dressing a wheel, as heretofore described, the objections and skill required are avoided and the turning is accomplished in accuracy and trueness. The cutting tool is constantly maintained in a centered relation with the axis of the wheel and its control uniform and positive for the entire circumference of the wheel. The cutting depth for making a roughing cut invariable although the degree of cut varies according to the untrueness of the tire or flange.

No constant regulation is made, nor dependent upon the skill of the operator to vary the feed adjustment of the tool as based upon gauging calculations or measurements pre-made by ascertaining a necessary amount required to be taken off for different portions of the circumference to bring it to a true circle. The tool regulation is set and maintained for a maximum degree of cut for the circumference of the tire as may be necessary for establishing a true circle.

As shown in Figures 1 and 4 to 7 inclusive, the radius or centering device preferably comprises a pair of right angle beams 18, 18, of duplicate construction, the angle form providing for convenience in making adjustments to meet different sizes of wheels and measurements between the wheel axle and brake beam with which the device connects. Therefore, it is not contemplated to be confined to such shape.

Each bar beam 18 consists of a pair of bars bent into L or right angle shape, secured together with an intermediate brace plate at the angle bend, with the inner side of the bars for the vertical limb of the beam, each provided with a longitudinal groove 19 to respectively receive the tongues 20 longitudinally on the opposite sides of a bracket 21. The bracket 21 is clamped between the bars of the vertical limb of the beam and secured thereto by several bolts 22. The limb has a series of holes therein in line with the groove 19 for making different elevation adjustments of the bracket.

A pair of spaced yoke bars 23 are fixed to the bracket as a unit, and project therefrom to straddle the wheel axle 4. The yoke carries a pair of rollers 24, 24, for anti-friction peripheral contact with the axle at relative opposite sides thereof. The rollers are journalled upon the yoke bars intermediate thereof, and the yoke is confined upon the axle by a pair of yoke clips 25, 25, each at one end respectively pivotally connected to the extremity of one of the limbs of the yoke, and the opposite ends are jointed by a bolt 26. The yokes of a pair of beams are connected together by an extensible tie or spreader bar 27. The bar at each of its opposite ends is arranged to clasp the upper limb of a yoke for rigidly tieing a pair of beams together.

The free end of the horizontal limb of the radius beam is provided with a tongue extension 28 adapted to bear either upon the upper or lower side of the brake beam. The drawings show the same upon the upper side of the beam. The tongue longitudinally thereof has a shank extension 29 disposed in an offset relation thereto longitudinally and engages between the bars of the horizontal limb of the beam and rigidly bolted thereto by several bolts. The shank is preferably provided with a row of holes for extensively mounting the tongue upon the end of the limb of the beam to accommodate for different distances between the brake beam and axle. The tongue at its rear end or union with the shank, and at each of its opposite sides, has an L-shaped clip 30 fixed thereto for bearing against the lower or opposite side of the brake beam from that of the tongue, and with the tongue, forms a fork connection with the brake beam and is sustained thereon against vertical displacement. The radius beam is bound at one end to the axle and at its opposite end slidably joins the brake beam and forms a stable gauge for governing and controlling the movement of the cutting tool toward the work or wheel tire.

A pair of radius beams are employed for equalizing purposes; these are disposed upon the axle intermediate of the opposite journal boxes, and each against its relative adjacent journal box. By means of the extensible tie or spreader bar connecting the two beams they are confined against lateral displacement and serve to position the beams as close to the cutter holders as possible. The axle bearing rollers can be set to different locations upon the limbs of the yoke to vary their spread to accommodate for different sizes of axles.

The angle formed of radius beams permits the beams to be readily applied between an axle and brake beam of locomotive drive wheels and extend about superimposed parts as an engine fire box, so that the installation can be made without removal of the parts which otherwise would form obstructions. The yoke and bifurcated opposite ends of the radius beams are relatively adjustable to connect the beam between an axle and brake beam of different sized wheels.

The radius beam limits the movement of the brake beam in a wheel braking direction, thereby correspondingly limiting the cutting feed or depth when the pressure is applied. The beam assumes the equivalent of a direct radius connection between the axis of the axle and the fulcrum of the tool holder and its connection with the axle allows sufficient freedom for axle rotation. Upon relieving the pressure of the brake beam, it is free to retreat and the cutting tool is released from the work.

The cutter normally is set relative to the tread of the tire to produce a definite depth of cut when the pressure is applied, and this is held constant and any change or alteration in the depth of cut requires a resetting of the tool. The operation of turning or machining the wheel tread and flange and effecting a wheel rotation may be accomplished in any feasible manner according to the equipment available for transporting the vehicle upon a section of the track.

The bifurcated ends of the radius beams are connected together by a spreader or tie bar 27 and additional tie connections can be made at other points for increasing the stability. Also, a strut connection between the radius beam and under-frame or chassis of the vehicle can be made to eliminate any vibrations or play that may interfere with an accurate turning or machining of the work.

In the modification of the tool holder shown in Figure 8, the arm 31 thereof at the lower side of the cutting tool or cutting tool receiving slot in the holder is provided, in substitution of a roller, with a nut 32 which may be either rigidly fixed or pivotally mounted to the extremity of the arm. A screw 33 is threaded through the nut and at its outer end has a forked or bifurcated sleeve 34 rotatively mounted thereon for making a straddle connection with the lower end of a hanger lever 5.

The screw provides a brace between the cutter head or holder and the brake beam adjustable for setting the tool relative to the work or tread of the wheel. It has been experienced that when using a head with a roller at each of its opposite ends, there is a tendency to drag the tool downward when cutting, throwing the pressure against the top roller and moving the bottom roller away from the wheel. This lowers the cutting edge of the tool on the tire and interferes with the turning of the tire to a true circle concentric with the axle.

By the use of the adjustable brace screw on the lower arm, the cutter can be held to remain at all times at the same position and to accommodate for a slight adjustment of the tool to position the same to a most effective cutting elevation.

Having described my invention, I claim:

1. A device for reconditioning the worn tread or tire of wheels of a railway vehicle having brake mechanism including brake heads, each having a brake shoe mounted thereon to engage with the wheel tread upon applying the braking pressure, comprising, a tool holder substituted for a brake head having a transverse groove in a face thereof adjacent the tread of the wheel for the reception of a metal cutting tool, a cutter in said groove to act upon the tread of the wheel, an arm extending from the holder at one side of the cutter to engage the wheel tread and a radius connection interposed between the axle of the wheel and the tool holder for regulating and controlling the cutter relative to the wheel tread when the pressure is applied to the brake mechanism, bringing the cutter into action to effect a cutting operation upon rotation of the wheel.

2. A device for reconditioning the worn tread or tire of wheels of a railway vehicle having brake mechanism including brake heads, each having a brake shoe mounted thereon to engage with the wheel tread upon applying the braking pressure, comprising, a tool holder substituted for a brake head and carrying a cutter to act upon the tread of the wheel, an arm extending from the holder at one side of the cutter to engage the wheel tread and a radius connection interposed between the axle of the wheel and the tool holder for regulating and controlling the cutter relative to the wheel tread when the pressure is applied to the brake mechanism, bringing the cutter into action to effect a cutting operation upon rotation of the wheel.

3. A device for reconditioning the worn tread or tire of wheels of a railway vehicle having brake mechanism including brake heads, each having a brake shoe mounted thereon to engage with the wheel tread upon applying the braking pressure, comprising, a tool holder substituted for a brake head a cutter carried by the tool holder to act upon the tread of the wheel, and an arm extending therefrom at one side of the cutter to engage the wheel tread and a radius connection interposed between the axle of the wheel and the tool holder for regulating and controlling the cutter relative to the wheel tread when the pressure is applied to the brake mechanism, bringing the cutter into action to effect a cutting operation upon rotation of the wheel.

4. A device for reconditioning the worn tread or tire of wheels of a railway vehicle having brake mechanism including brake heads, each having a brake shoe mounted thereon to engage with the wheel tread upon applying the braking pressure, comprising, a tool holder substituted for a brake head having a cutter to act upon the tread of the wheel, and a radius connection interposed between the axle of the wheel and the tool holder for regulating and controlling the cutter relative to the wheel tread when the pressure is applied to the brake mechanism, bringing the cutter into action to effect a cutting operation upon rotation of the wheel.

5. A device for reconditioning the worn tread or tire of wheels of a railway vehicle having brake mechanism including pivoted flanges, brake beams and brake heads, the brake heads each having a brake shoe mounted thereon to engage with the wheel tread upon applying the braking pressure, a tool holder substituted for a brake head having a cutter to act upon the tread of the wheel, and a radius connection interposed between the axle of the wheel and the tool holder at one end having an embracing connection with the wheel axle and at its opposite end a sliding connection with the brake beam for regulating and controlling the cutter relative to the wheel tread when the pressure is applied to the brake mechanism, bringing the cutter into action to effect a cutting operation upon rotation of the wheel.

6. In a device of the character described, a cutting tool holder adapted to be pivotally mounted upon the hanger of a brake mechanism of a railway vehicle in substitution for a brake head and in position to be adjacent the tread of the wheel, and centrally thereof provided for holding a cutting tool to act upon the wheel tread, a roller carried by the holder at one side of the cutting tool normally engaged with the tread of the wheel, and a screw carried by the holder at a side of the tool opposite from the roller and bearing against the hanger.

7. In a device of the character described, a cutting tool holder adapted to be pivotally mounted upon the brake mechanism of a railway vehicle in substitution for a brake head and in position to be adjacent the tread of the wheel, and centrally thereof provided for holding a cutting tool to act upon the wheel tread, a roller carried by the holder at one side of the cutting tool normally engaged with the tread of the wheel, and means carried by the holder at a side of the tool opposite from the roller and bearing against the support sustaining the holder.

8. In a device of the character described, a cutting tool holder adapted to be pivotally mounted upon brake mechanism of a railway vehicle in substitution for a brake head and in position to be adjacent the tread of the wheel, and centrally thereof provided for holding a cutting tool to act upon the wheel tread, and at one end at one side of the cutting tool normally engaged with the tread of the wheel, and an adjustable strut engaging between the tool holder and its support at a side of the tool opposite from the end engaged with the tread of the wheel.

FRANK L. HALL.